US012543005B2

(12) United States Patent
Xie et al.

(10) Patent No.: US 12,543,005 B2
(45) Date of Patent: Feb. 3, 2026

(54) HIGH-ACOUSTIC-RESISTANCE PISTON MOTION LOUDSPEAKER

(71) Applicant: BEIJING INSTITUTE OF TECHNOLOGY, Beijing (CN)

(72) Inventors: Huikai Xie, Beijing (CN); Qincheng Zheng, Beijing (CN); Ke Cao, Beijing (CN); Yao Lu, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 279 days.

(21) Appl. No.: 18/223,488

(22) Filed: Jul. 18, 2023

(65) Prior Publication Data

US 2024/0137704 A1 Apr. 25, 2024
US 2024/0236575 A9 Jul. 11, 2024

(30) Foreign Application Priority Data

Oct. 20, 2022 (CN) ......................... 202211283609.5

(51) Int. Cl.
*H04R 7/04* (2006.01)

(52) U.S. Cl.
CPC ......... *H04R 7/04* (2013.01); *H04R 2307/207* (2013.01)

(58) Field of Classification Search
CPC ................ H04R 7/04; H04R 2307/207; H04R 2201/003; H04R 19/04; H04R 19/005; B81B 2203/0127; B81B 2203/0257
See application file for complete search history.

(56) References Cited

U.S. PATENT DOCUMENTS

2018/0091905 A1* 3/2018 Clerici .................. B81C 99/004

FOREIGN PATENT DOCUMENTS

CN 217935867 U * 11/2022 ........... H04R 1/2811

* cited by examiner

*Primary Examiner* — Sunita Joshi
(74) *Attorney, Agent, or Firm* — Maschoff Brennan

(57) ABSTRACT

A high-acoustic-resistance piston motion loudspeaker disclosed in the present disclosure belongs to the field of sound-electricity conversion. The loudspeaker includes a substrate, a driving assembly, a vibrating diaphragm, a connecting assembly and a vibration cavity. The connecting assembly is not coplanar with the vibrating diaphragm, which is of a concealed connecting structure. The driving assembly is configured to drive the vibrating diaphragm to generate a piston motion. The vibrating diaphragm is located in the vibration cavity, and a displacement range of the vibrating diaphragm in a perpendicular direction is within a height range of the vibration cavity formed by a supporting structure extending in a thickness direction of a base, so as to achieve purposes of reducing air leakage and improving a sound pressure level in a working process of the loudspeaker.

9 Claims, 6 Drawing Sheets

HIGH-ACOUSTIC-RESISTANCE PISTON MOTION LOUDSPEAKER

CROSS-REFERENCE TO APPLICATIONS

This application claims priority to Chinese Patent Application No. 202211283609.5, filed on Oct. 20, 2022, and entitled "High-Acoustic-Resistance Piston Motion Loudspeaker", the entire contents of which are incorporated herein by reference.

TECHNICAL FIELD

The disclosure belongs to an acoustic device in the field of sound-electricity conversion, and relates to a structural design of a high-acoustic-resistance piston loudspeaker, which may be applied to consumer electronics or medical electronics.

BACKGROUND

A core indicator of a loudspeaker is an output sound pressure level (SPL) at a certain position. Since an output sound pressure of the loudspeaker is directly proportional to a square of a frequency and a first power of vibrating diaphragm displacement, the SPL is usually small at a low frequency (20 Hz-1 kHz), and under a condition that a device size is at a mm or even um level, the SPL at 10 mm in a free field testing environment is difficult to exceed 80 dB. For example, in order to realize a purpose of 80-dB SPL at 10 mm at the frequency of 1 kHz, a conventional fully-enclosed fixed support diaphragm (a diameter of a circular diaphragm is 3 mm) loudspeaker needs to reach 40-um vibrating diaphragm displacement, which is very difficult for the fully-enclosed fixed support diaphragm loudspeaker, and thus, it is necessary to use an open piston motion mode loudspeaker based on a driving structure.

Compared with the conventional fully-enclosed fixed support diaphragm loudspeaker, for the open piston motion mode loudspeaker based on the driving structure, since a fixed support state of the vibrating diaphragm is changed, restriction factors of boundary conditions of the vibrating diaphragm during vibration are significantly reduced, moreover, the vibrating diaphragm relies on the driving structure for motion, a motion range of the driving structure is much larger than that of the conventional fully-enclosed fixed support diaphragm, and therefore, the open piston motion mode loudspeaker based on the driving structure may realize larger vibrating diaphragm displacement. At the same time, for the open piston motion mode loudspeaker based on the driving structure, since a mechanical-acoustic energy conversion coefficient corresponding to a piston vibration mode is three times a mechanical-acoustic energy conversion coefficient of a vibrating diaphragm vibration mode of the conventional fully-enclosed fixed support diaphragm loudspeaker, a larger sound pressure output may be generated under the same size and excitation conditions. Therefore, the open piston motion mode loudspeaker based on the driving structure has more advantages in vibrating diaphragm displacement.

However, the open piston motion mode loudspeaker based on the driving structure has a problem of acoustic short circuit between front and rear cavities. During vibration of the vibrating diaphragm, the front cavity and the rear cavity generate audio signals with opposite phases at the same moment, and if there is a large air gap between the front and rear cavities, the audio signals of the front and rear cavities will weaken an audio signal generated by the loudspeaker after being superposed through the air gap, which corresponds to acoustic resistance of the air gap between the front and rear cavities. On the premise of not affecting the vibration of an air spring of the rear cavity, the smaller the air gap is, the greater the corresponding acoustic resistance between the front and rear cavities is, and the greater a conversion coefficient of converting energy generated by a mechanical motion of the vibrating diaphragm into energy of sound radiated by the front cavity to the air is, thereby generating a larger SPL.

Taking a square diaphragm with a side length of 3 mm as an example, and assuming that a length of an air gap formed between an edge of the vibrating diaphragm and a sidewall structure is 20 um at a room temperature, since the acoustic resistance is directly proportional to a first power of an air viscosity coefficient and a first power of the air gap length, and is inversely proportional to a square of a cross-sectional area of the air gap, when a distance between the edge of the vibrating diaphragm and the sidewall structure is increased, the acoustic resistance is reduced quickly, and the SPL at 10 mm is driven to be reduced quickly, referring to FIG. 2 (*a*) and FIG. 2 (*b*). At the same time, if the distance between the edge of the fixed vibrating diaphragm and the sidewall structure is 2 um, when the length of the air gap formed between the edge of the vibrating diaphragm and the sidewall structure is increased, the acoustic resistance will be increased, and the SPL at 10 mm is driven to be increased, referring to FIG. 3 (*a*) and FIG. 3 (*b*).

Therefore, it is necessary to provide an improved piston loudspeaker that can generate a large displacement motion of the vibrating diaphragm and also provide sufficient acoustic resistance between the front and rear cavities, thereby increasing the output sound pressure level of the loudspeaker.

SUMMARY

Different from a connecting structure coplanar with a vibrating diaphragm in a traditional piston loudspeaker, a high-acoustic-resistance piston motion loudspeaker disclosed in the present disclosure adopts a concealed connecting structure not coplanar with the vibrating diaphragm, and a displacement range of the vibrating diaphragm in a perpendicular direction is within a height range of a cavity formed by a supporting structure extending in a thickness direction of a base. On the basis of maintaining an advantage of large motion displacement of a piston loudspeaker, the concealed connecting structure may significantly alleviate a problem of serious air leakage caused by structural design and process limitations, and increase an acoustic resistance value of front and rear cavities of the piston motion loudspeaker in a working state, so that an output sound pressure level of the piston motion loudspeaker is effectively increased. In addition, by optimizing design of a vibrating diaphragm structure, the supporting structure and other assemblies of the piston loudspeaker with the above concealed connecting structure, a length and cross-sectional area of an air gap between the front and rear cavities and an opening of the base may be adjusted, and the effect of further increasing the acoustic resistance and the output sound pressure level is achieved.

The purposes of the present disclosure are implemented through the following technical solution.

A high-acoustic-resistance piston motion loudspeaker disclosed in the present disclosure includes a substrate, a vibration cavity, a driving assembly, a connecting assembly and a vibrating diaphragm. The substrate includes a base and a supporting structure extending in a thickness direction of the base, and a periphery of the supporting structure is enclosed to form the vibration cavity. The connecting assembly is not coplanar with the vibrating diaphragm, which is of a concealed connecting structure. The driving assembly and the connecting assembly are of the same structure or different structures, configured to drive the vibrating diaphragm to generate a piston motion, and composed of one or more groups of driving units. The vibrating diaphragm is located in the vibration cavity, the vibrating diaphragm is not coplanar with the connecting assembly, the vibrating diaphragm is above or below the connecting assembly to realize the concealed connecting structure, and a displacement range of the vibrating diaphragm in a perpendicular direction is within a height range of the vibration cavity formed by the supporting structure extending in the thickness direction of the base, so as to achieve purposes of reducing air leakage and improving a sound pressure level in a working process of the loudspeaker.

Design of a vibrating diaphragm structure, the supporting structure and other assemblies of the loudspeaker are further optimized based on the piston loudspeaker with the concealed connecting structure. That is, design of a shape, size and number of openings of the base in a direction parallel to the vibrating diaphragm is optimized, a distance between the vibrating diaphragm and the supporting structure extending in the thickness direction of the base in a direction parallel to the vibrating diaphragm is reduced as much as possible, an overlapping distance between the vibrating diaphragm and the supporting structure extending in the thickness direction of the base in a direction perpendicular to the vibrating diaphragm is increased as much as possible, design of a shape of the supporting structure extending in the thickness direction of the base is optimized, so that a phenomenon of air leakage in the working process of the loudspeaker is controlled, and acoustic resistance of front and rear cavities and an output sound pressure level of the loudspeaker are further increased.

In one embodiment of the present disclosure, an optimized structure for further controlling a problem of air leakage by adjusting the vibrating diaphragm structure and the supporting structure is that the distance between the vibrating diaphragm and the supporting structure extending in the thickness direction of the base in a direction parallel to the vibrating diaphragm is as small as possible, the overlapping distance between the vibrating diaphragm and the supporting structure extending in the thickness direction of the base in a direction perpendicular to the vibrating diaphragm is as large as possible, and the supporting structure extending in the thickness direction of the base is successive in the thickness direction and is perpendicular to the vibrating diaphragm, so that a problem of air leakage is controlled, and a requirement of manufacturing flexibility is met.

In one embodiment of the present disclosure, an optimized structure for further controlling a problem of air leakage by adjusting the vibrating diaphragm structure and the supporting structure is that the distance between the vibrating diaphragm and the supporting structure extending in the thickness direction of the base in a direction parallel to the vibrating diaphragm is as small as possible, the overlapping distance between the vibrating diaphragm and the supporting structure extending in the thickness direction of the base in a direction perpendicular to the vibrating diaphragm is as large as possible, and the supporting structure extending in the thickness direction of the base is not successive in the thickness direction and is perpendicular to the vibrating diaphragm in segments, so that a problem of air leakage is controlled, a thin film with a large area is prepared, and a requirement of manufacturing flexibility is met.

In one embodiment of the present disclosure, an optimized structure for further controlling a problem of air leakage by adjusting the vibrating diaphragm structure and the supporting structure is that the distance between the vibrating diaphragm and the supporting structure extending in the thickness direction of the base in a direction parallel to the vibrating diaphragm is as small as possible, the overlapping distance between the vibrating diaphragm and the supporting structure extending in the thickness direction of the base in a direction perpendicular to the vibrating diaphragm is as large as possible, the supporting structure extending in the thickness direction of the base is not perpendicular to the vibrating diaphragm and forms an obtuse angle or an acute angle with the vibrating diaphragm, so that a problem of air leakage is controlled, a thin film is prepared, and a requirement of manufacturing flexibility is met.

In one embodiment of the present application, an optimized structure for further controlling a problem of air leakage by adjusting the vibrating diaphragm structure and the supporting structure is that the distance between the vibrating diaphragm and the supporting structure extending in the thickness direction of the base in the direction parallel to the vibrating diaphragm is as small as possible, the overlapping distance between the vibrating diaphragm and the supporting structure extending in the thickness direction of the base in the direction perpendicular to the vibrating diaphragm is as large as possible, the shape, size and number of the openings of the base in the direction parallel to the vibrating diaphragm are adjusted, so that the problem of air leakage problem is controlled, a thin film is prepared, and a requirement of manufacturing flexibility is met.

In order to be compatible with the process and flexible design, as a further improvement, a driving structure is implemented based on an electromagnetic driving principle, a piezoelectric driving principle or an electric heating driving principle, and the driving units are driving arms or electromagnetic coils.

In order to enhance the power of the driving assembly and facilitate the design of the driving assembly, as a further improvement, each group of the driving units of the driving assembly includes a single-driving-arm structure, a double-driving-arm side-by-side structure or a three-driving-arm side-by-side structure.

In order to ensure that a thin film can vibrate stably, as a further improvement, the driving assembly includes one group, two groups, four groups or more groups of the driving arm structure.

In order to enhance robustness of the driving assembly and adjust a resonant frequency and stress distribution of the driving assembly, as a further improvement, each driving arm structure of the driving assembly is in an L shape, an S shape, a spiral shape or a serpentiform shape.

In order to design flexibly and increase the symmetry of the thin film, as a further improvement, a top view of the vibrating diaphragm is a rectangle, a circle or other regular shapes, such as a regular pentagon and a regular hexagon. The shape of the vibrating diaphragm is matched with a shape projected by the vibration cavity on a horizontal plane.

In order to increase the acoustic resistance of the front and rear cavities, as a further improvement, a cross-sectional view of the vibrating diaphragm is a rectangle, the Chinese radical "cover", or the inverted Chinese radical "cover".

In order to further increase the acoustic resistance of the front and rear cavities and be compatible with process manufacturing, as a further improvement, a cross-sectional view of the supporting structure is a rectangle, a trapezoid, an isosceles trapezoid, an inverted isosceles trapezoid, a convex shape, or an inverted convex shape.

In order to reduce the device size and miniaturize the loudspeaker, as a further improvement, the loudspeaker is an MEMS high-acoustic-resistance piston motion loudspeaker.

A working method of the high-acoustic-resistance piston motion loudspeaker disclosed in the present disclosure is: under an exciting action of an external electrical signal, the driving assembly is forced to make mechanical deformation and drive the vibrating diaphragm to make the piston motion in a direction perpendicular to the vibrating diaphragm. The vibrating diaphragm making the piston motion in a perpendicular direction drives air inside the vibration cavity to move, so as to generate an acoustic wave signal. The vibrating diaphragm is not coplanar with the connecting assembly, and the displacement range of the vibrating diaphragm in the perpendicular direction is within the height range of the vibration cavity formed by the supporting structure extending in the thickness direction of the base. In addition, the vibrating diaphragm, the supporting structure and other assemblies of the loudspeaker are further optimized, so that air leakage caused by a gap may be effectively controlled, the acoustic resistance of the front and rear cavities is increased, sound pressure level loss is reduced, and the output sound pressure level of the loudspeaker is improved.

Beneficial Effects

1. The high-acoustic-resistance piston motion loudspeaker disclosed in the present disclosure has the concealed connecting structure, which may increase the acoustic resistance between the front and rear cavities of the piston loudspeaker during working, and improve the output sound pressure level of the loudspeaker. It is suitable for traditional loudspeaker design and manufacturing, as well as the design and manufacturing process of the MEMS loudspeaker.
2. Compared with a piston loudspeaker structure in which the connecting assembly and the vibrating diaphragm are located on the same plane and a large air gap penetrating through the front and rear cavities is formed when making the piston motion, for the high-acoustic-resistance piston motion loudspeaker disclosed in the present disclosure, since the vibrating diaphragm is not coplanar with the connecting assembly, the displacement range of the vibrating diaphragm is within the height range of the vibration cavity, the cross-sectional area of the air gap between the front and rear cavities during the piston motion of the vibrating diaphragm in the perpendicular direction is reduced, and air leakage is alleviated. In addition, based on the principle of increasing the length of the air gap between the front and rear cavities and reducing the cross-sectional area of the air gap between the front and rear cavities, the vibrating diaphragm and the supporting structure of the piston motion loudspeaker with the concealed connecting structure are optimized to jointly increase the acoustic resistance of the front and rear cavities and improve the sound pressure level of the sound output, and four specific structures that meet the structural optimization principle and realize the optimization technical effects are specifically provided.
3. Compared with a loudspeaker with the vibrating diaphragm fixed and supported at an edge, for the high-acoustic-resistance piston motion loudspeaker disclosed in the present disclosure, since the vibrating diaphragm is connected with the supporting structure through the connecting assembly, compared with the vibrating diaphragm fixed and supported at the edge, the displacement that the vibrating diaphragm may reach in the vibration process is not limited by the supporting structure, which improves a vibration amplitude of the vibrating diaphragm, and thus the output sound pressure level of the loudspeaker is improved.
4. The high-acoustic-resistance piston motion loudspeaker disclosed in the present disclosure significantly enriches the design and manufacturing freedom of the piston motion loudspeaker. The advantages are applied to the design and manufacturing of the piston loudspeaker, which may increase the acoustic resistance of the front and rear cavities and the output sound pressure level of the loudspeaker.

BRIEF DESCRIPTION OF THE DRAWINGS

FIG. 1 is a conceptual diagram of a high-acoustic-resistance piston motion loudspeaker provided by the present disclosure, which is a schematic structural diagram of a cross section of a high-acoustic-resistance piston motion loudspeaker provided in Embodiment 5, in which

001—High-acoustic-resistance piston motion loudspeaker, 010—Substrate, 020—Driving assembly, 030—Vibrating diaphragm, 040—Connecting assembly, and 050—Vibration cavity.

Figure 2A:
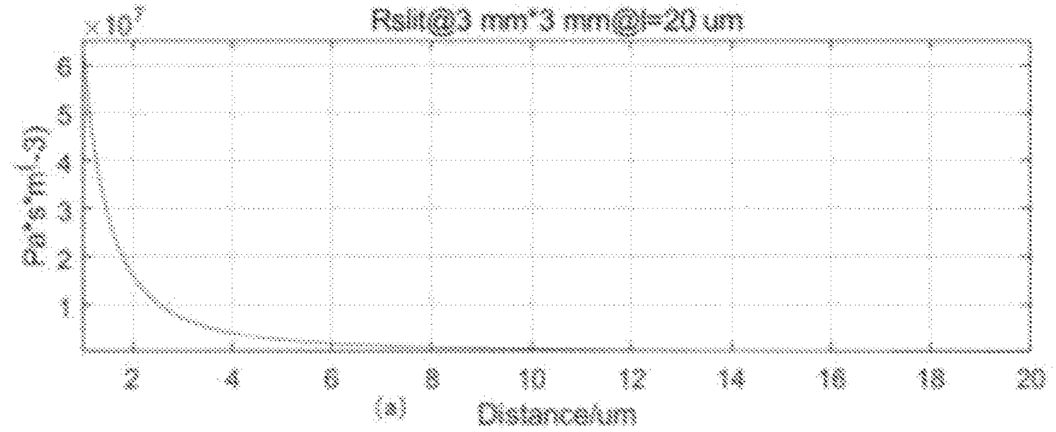
Figure 2B:
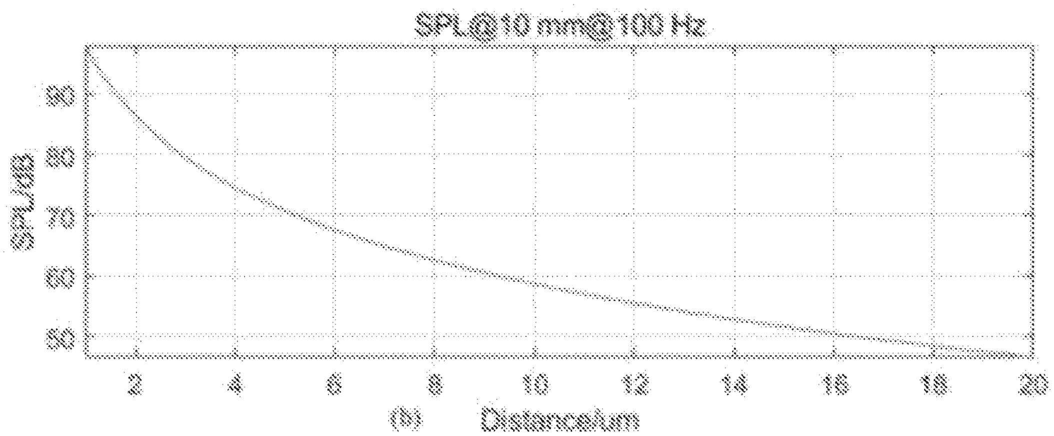

FIG. 2 (*a*) and FIG. 2 (*b*) are curve diagrams of acoustic resistance magnitude and an output sound pressure level changing with a distance between an edge and a side wall of a vibrating diaphragm.

Figure 3A:
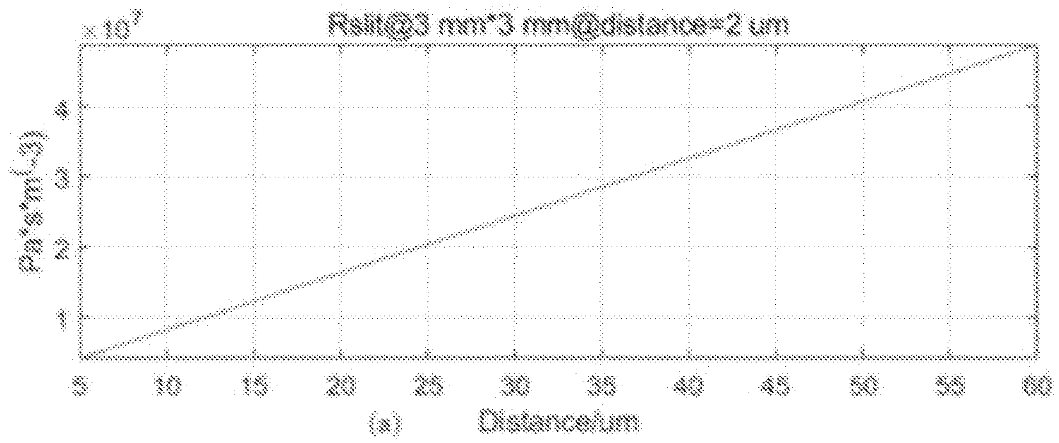
Figure 3B:
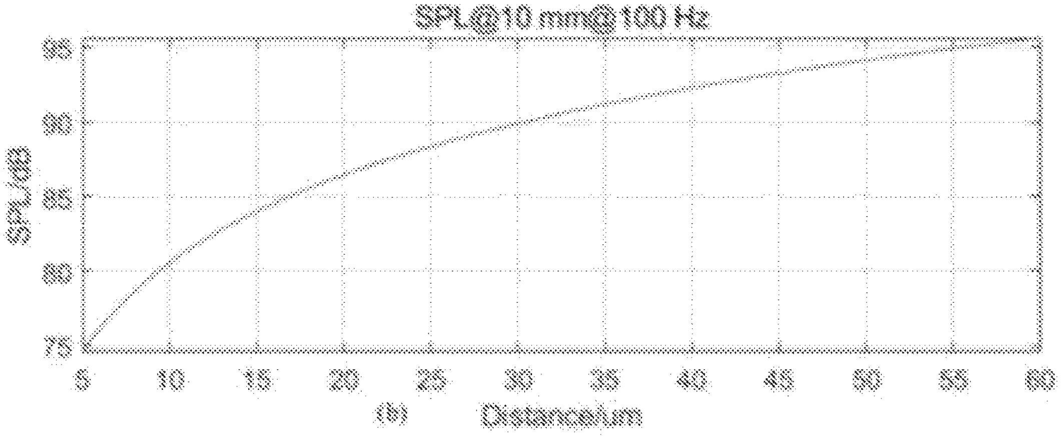

FIG. 3 (*a*) and FIG. 3 (*b*) are curve diagrams of acoustic resistance magnitude and an output sound pressure level changing with lengths of an edge and a side wall of a vibrating diaphragm in a thickness direction.

Figure 4:
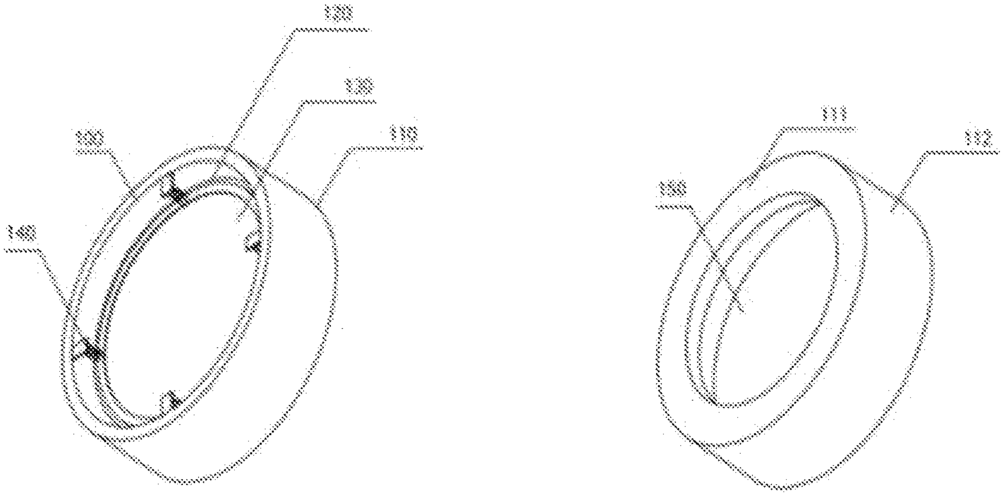

FIG. 4 is a three-dimensional structural diagram of a high-acoustic-resistance piston motion loudspeaker provided in Embodiment 1 of the present disclosure.

Figure 5:
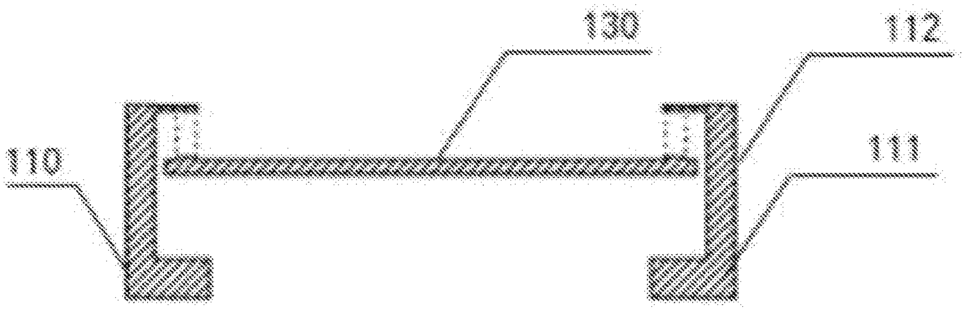

FIG. 5 is a schematic structural diagram of a cross section of a high-acoustic-resistance piston motion loudspeaker provided in Embodiment 1 of the present disclosure, in which 100—High-acoustic-resistance piston motion loudspeaker, 110—Substrate, 120—Driving assembly, 130—Vibrating diaphragm, 140—Connecting assembly, and 150—Vibration cavity.

Figure 6:
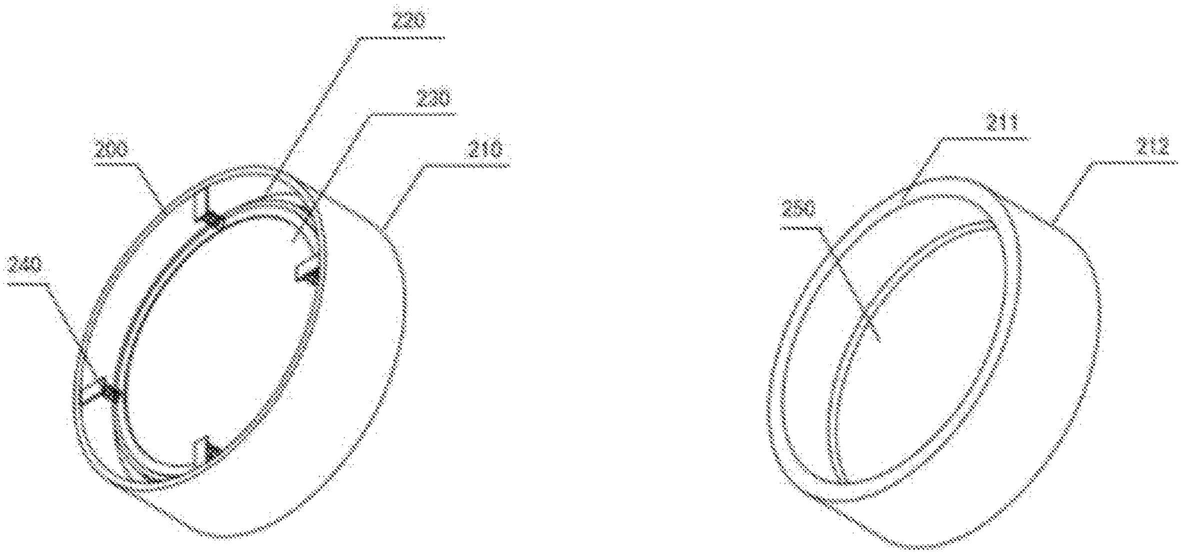

FIG. 6 is a three-dimensional structural diagram of a high-acoustic-resistance piston motion loudspeaker provided in Embodiment 2 of the present disclosure.

Figure 7:
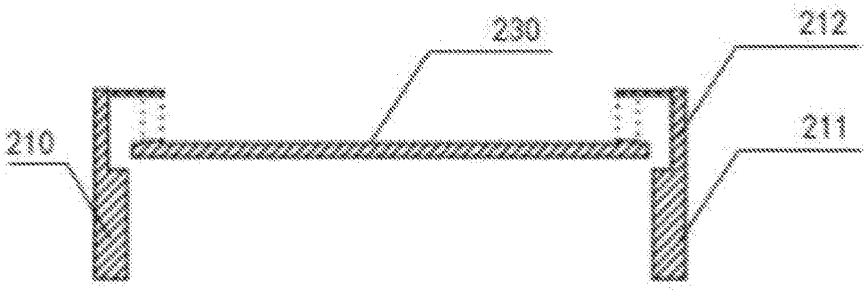

FIG. 7 is a schematic structural diagram of a cross section of a high-acoustic-resistance piston motion loudspeaker provided in Embodiment 2 of the present disclosure, in which

200—High-acoustic-resistance piston motion loudspeaker, 210—Substrate, 220—Driving assembly, 230—Vibrating diaphragm, 240—Connecting assembly, and 250—Vibration cavity.

Figure 8:
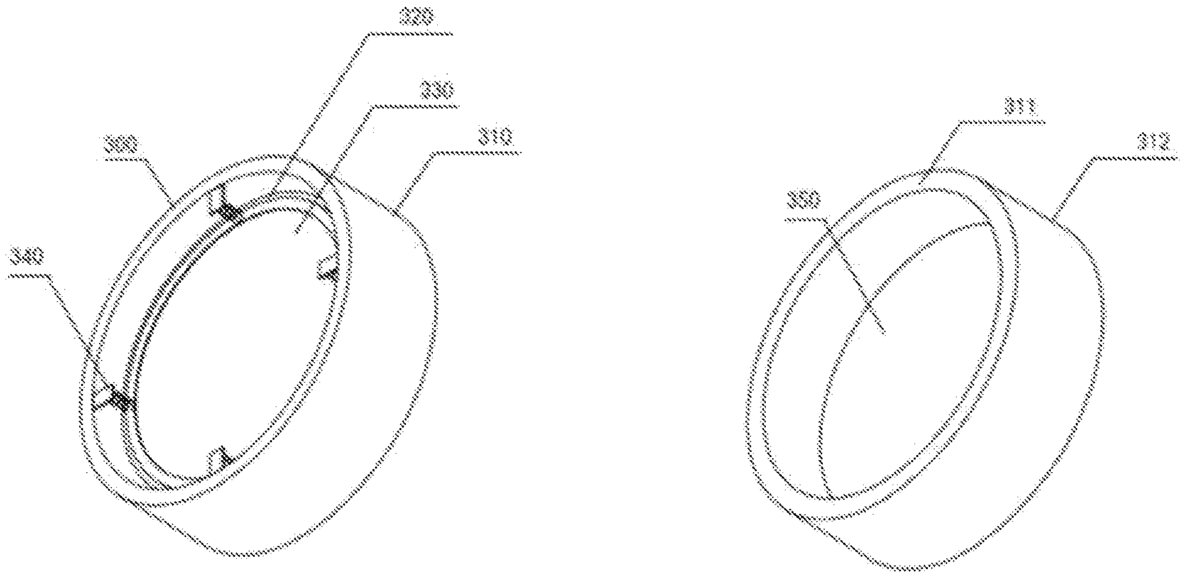

FIG. 8 is a three-dimensional structural diagram of a high-acoustic-resistance piston motion loudspeaker provided in Embodiment 3 of the present disclosure.

Figure 9:
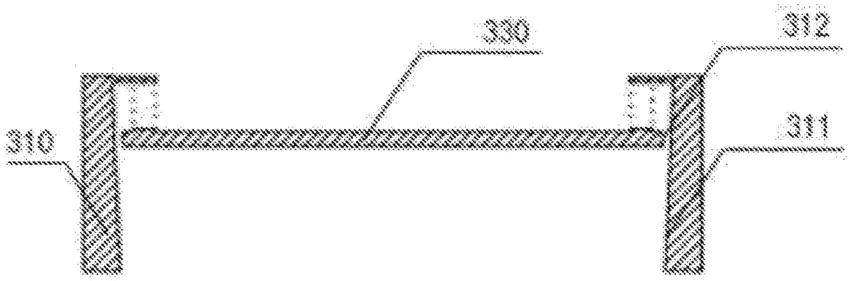

FIG. 9 is a schematic structural diagram of a cross section of a high-acoustic-resistance piston motion loudspeaker provided in Embodiment 3 of the present disclosure, in which

300—High-acoustic-resistance piston motion loudspeaker, 310—Substrate, 320—Driving assembly, 330—Vibrating diaphragm, 340—Connecting assembly, and 350—Vibration cavity.

Figure 10:
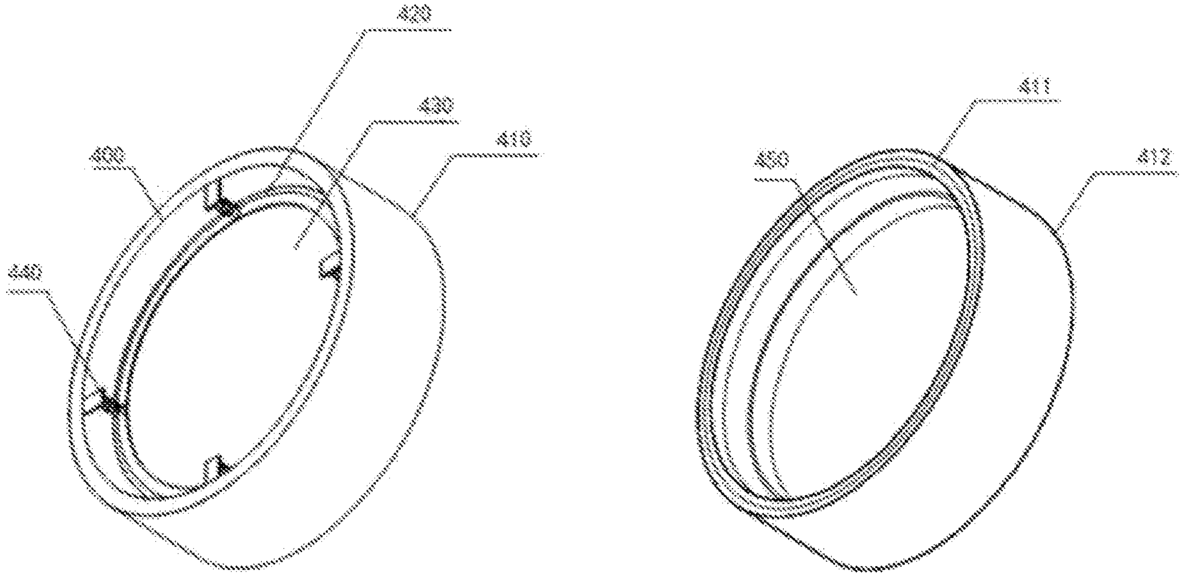

FIG. 10 is a three-dimensional structural diagram of a high-acoustic-resistance piston motion loudspeaker provided in Embodiment 4 of the present disclosure.

Figure 11:
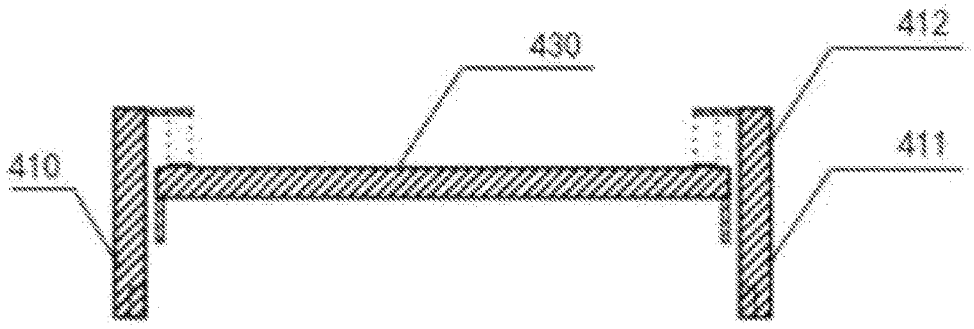

FIG. 11 is a schematic structural diagram of a cross section of a high-acoustic-resistance piston motion loudspeaker provided in Embodiment 4 of the present disclosure, in which

400—High-acoustic-resistance piston motion loudspeaker, 410—Substrate, 420—Driving assembly, 430—Vibrating diaphragm, 440—Connecting assembly, and 450—Vibration cavity.

DETAILED DESCRIPTION

In order to better illustrate objectives and advantages of the present disclosure, contents of the present disclosure will be further described in conjunction with accompanying drawings and examples below.

It should be noted that all directional indications (such as up, down, left, right, front, rear, inside, outside, top, bottom . . . ) in embodiments of the present disclosure are only used for explaining a relative position relation between components in a specific posture (as shown in the accompanying drawings). If the specific posture changes, the directional indications also change accordingly.

Embodiment 1

Please refer to FIG. 4, a high-acoustic-resistance piston motion loudspeaker 100 provided according to Embodiment 1 of the present disclosure includes a substrate 110, a driving assembly 120, a vibrating diaphragm 130, a connecting assembly 140 and a cavity 150. The vibrating diaphragm 130 is a circle, and a cross section of the cavity 150 is a circle, which is matched with a shape of the vibrating diaphragm 130. The driving assembly 120 is of a spiral structure, and is embedded into the vibrating diaphragm 130. The substrate 110 includes a base 111 and a supporting structure 112 obtained by extending in a thickness direction. The connecting assembly 140 includes four groups of spiral spring structures, and are configured to connect the supporting structure 112 and the vibrating diaphragm 130. The supporting structure 112 is enclosed to form the cavity 150.

Please refer to the schematic cross-sectional view of FIG. 5, it is based on a structural design principle that a distance between the vibrating diaphragm and the supporting structure in a direction parallel to the vibrating diaphragm is as small as possible. In the high-acoustic-resistance piston motion loudspeaker 100 provided in Embodiment 1 of the present disclosure, the connecting assembly 140 is not coplanar with the vibrating diaphragm 130. The connecting assembly 140 has an overlapping part with a projection region of the vibrating diaphragm 130 on a horizontal plane, which is of a concealed connecting structure. A width of a gap between the vibrating diaphragm 130 and the supporting structure 112 in a horizontal direction is smaller than a width of the connecting assembly 140, which effectively reduces a cross-sectional area of an air gap between front and rear cavities. In the working state of the loudspeaker, a displacement range of the vibrating diaphragm 130 is within a height range of the cavity 150, it is ensured that the cross-sectional area of the air gap between the front and rear cavities in the whole working process is maintained at a small value, and a purpose of increasing the acoustic resistance of the front and rear cavities is achieved.

Please refer to the schematic cross-sectional view of FIG. 5, it is based on a structural design principle that the shape, size and number of openings of the base in the direction parallel to the vibrating diaphragm are adjusted. In the high-acoustic-resistance piston motion loudspeaker 100 provided in Embodiment 1 of the present disclosure, a through hole is formed in a central position of the base 111, a blocking structure is arranged at a remaining part of the base, air leakage between the front and rear cavities is reduced, and the purpose of increasing the acoustic resistance of the front and rear cavities is achieved.

Taking electromagnetic drive as an example, an embodiment of the present disclosure further provides a manufacturing method of a high-acoustic-resistance piston motion electromagnetic loudspeaker 100, including:

- a substrate containing a through hole and a supporting structure are manufactured to form a cavity with a thin film that makes a piston motion in a perpendicular direction, and an annular magnet is embedded in the supporting structure;
- a cylindrical thin film structure is manufactured, containing a metal coil, namely a driving assembly; and
- the thin film structure is connected with the supporting structure through a connecting assembly, namely a spiral metal coil, so as to form an electromagnetic loudspeaker with a concealed connecting structure.

Embodiment 2

Please refer to FIG. 6, a high-acoustic-resistance piston motion loudspeaker 200 provided according to Embodiment 2 of the present disclosure includes a substrate 210, a driving assembly 220, a vibrating diaphragm 230, a connecting assembly 240 and a cavity 250. The vibrating diaphragm 230 is a circle, and a cross section of the cavity 250 is a circle, which is matched with a shape of the vibrating diaphragm 230. The driving assembly 220 is of a spiral structure, and is embedded into the vibrating diaphragm 230. The substrate 210 includes a base 211 and a supporting structure 212 obtained by extending in a thickness direction. The connecting assembly 240 includes four groups of spiral spring structures, and are configured to connect the supporting structure 212 and the vibrating diaphragm 230. The supporting structure 212 is enclosed to form the cavity 250.

Please refer to the schematic cross-sectional view of FIG. 7, it is based on a structural design principle that a distance between the vibrating diaphragm and the supporting structure in a direction parallel to the vibrating diaphragm is as small as possible. In the high-acoustic-resistance piston motion loudspeaker 200 provided in Embodiment 2 of the present disclosure, the connecting assembly 240 is not coplanar with the vibrating diaphragm 230. The connecting assembly 240 has an overlapping part with a projection region of the vibrating diaphragm 230 on a horizontal plane, which is of a concealed connecting structure. A width of a gap between the vibrating diaphragm 230 and the supporting structure 212 in a horizontal direction is smaller than a width of the connecting assembly 240, which effectively reduces a cross-sectional area of an air gap between front and rear cavities. In the working state of the loudspeaker, a displacement range of the vibrating diaphragm 230 is within a height range of the cavity 250, it is ensured that the cross-sectional area of the air gap between the front and rear cavities in the whole working process is maintained at a small value, and a purpose of increasing the acoustic resistance of the front and rear cavities is achieved.

Please refer to the schematic cross-sectional view of FIG. 7, it is based on a structural design principle that a distance between the vibrating diaphragm and the supporting structure in a direction parallel to the vibrating diaphragm is as small as possible, and the supporting structure is not successive in a thickness direction and is perpendicular to the vibrating diaphragm in segments. In the high-acoustic-resistance piston motion loudspeaker 200 provided in Embodiment 2 of the present disclosure, a cross-sectional view of the supporting structure 212 is an inverted convex shape. In order to meet process demands, an upper side size of the cavity 250 is large. After the device is released, in the working state, the displacement range of the vibrating diaphragm 230 is within a smaller range of a lower side size of the cavity 250, a problem of a large distance between the vibrating diaphragm and the supporting structure in the direction parallel to the vibrating diaphragm caused by process limitations is solved to a certain extent, it is ensured that the cross-sectional area of the air gap between the front and rear cavities is maintained at a small value, and the purpose of increasing the acoustic resistance of the front and rear cavities is achieved.

Embodiment 3

Please refer to FIG. 8, a high-acoustic-resistance piston motion loudspeaker 300 provided according to Embodiment 3 of the present disclosure includes a substrate 310, a driving assembly 320, a vibrating diaphragm 330, a connecting assembly 340 and a cavity 350. The vibrating diaphragm 330 is a circle, and a cross section of the cavity 350 is a circle, which is matched with a shape of the vibrating diaphragm 330. The driving assembly 320 is of a spiral structure, and is embedded into the vibrating diaphragm 330. The substrate 310 includes a base 311 and a supporting structure 312 obtained by extending in a thickness direction. The connecting assembly 340 includes four groups of spiral spring structures, and are configured to connect the supporting structure 312 and the vibrating diaphragm 330. The supporting structure 312 is enclosed to form the cavity 350.

Please refer to the schematic cross-sectional view of FIG. 9, it is based on a structural design principle that a distance between the vibrating diaphragm and the supporting structure in a direction parallel to the vibrating diaphragm is as small as possible. In the high-acoustic-resistance piston motion loudspeaker 300 provided in Embodiment 3 of the present disclosure, the connecting assembly 340 is not coplanar with the vibrating diaphragm 330. The connecting assembly 340 has an overlapping part with a projection region of the vibrating diaphragm 330 on a horizontal plane, which is of a concealed connecting structure. A width of a gap between the vibrating diaphragm 330 and the supporting structure 312 in a horizontal direction is smaller than a width of the connecting assembly 340, which effectively reduces a cross-sectional area of an air gap between front and rear cavities. In the working state of the loudspeaker, a displacement range of the vibrating diaphragm 330 is within a height range of the cavity 350, it is ensured that the cross-sectional area of the air gap between the front and rear cavities in the whole working process is maintained at a small value, and a purpose of increasing the acoustic resistance of the front and rear cavities is achieved.

Please refer to the schematic cross-sectional view of FIG. 9, it is based on a structural design principle that a distance between the vibrating diaphragm and the supporting structure in a direction parallel to the vibrating diaphragm is as small as possible, the supporting structure is successive in a thickness direction but not perpendicular to the vibrating diaphragm, and forms a certain tilt angle with the vibrating diaphragm. In the high-acoustic-resistance piston motion loudspeaker 300 provided in Embodiment 3 of the present disclosure, a cross-sectional view of the supporting structure 312 is an inverted isosceles trapezoid. In order to meet process demands, a size of the cavity 350 is gradually increased from the base 311 to the vibrating diaphragm 330. Compared with a loudspeaker structure with a side wall of a cavity being perpendicular to the vibrating diaphragm, and when the vibrating diaphragm 330 moves to a position close to the base 311 in the working state, the cross-sectional area of the air gap between the front and rear cavities is reduced obviously. The problem of the large distance between the vibrating diaphragm and the supporting structure in the direction parallel to the vibrating diaphragm caused by process limitations is solved to a certain extent, and the purpose of increasing the acoustic resistance of the front and rear cavities is achieved.

Embodiment 4

Please refer to FIG. 10, a high-acoustic-resistance piston motion loudspeaker 400 provided according to Embodiment 4 of the present disclosure includes a substrate 410, a driving assembly 420, a vibrating diaphragm 430, a connecting assembly 440 and a cavity 450. The vibrating diaphragm 430 is a circle, and a cross section of the cavity 450 is a circle, which is matched with a shape of the vibrating diaphragm 430. The driving assembly 420 is of a spiral structure, and is embedded into the vibrating diaphragm 430. The substrate 410 includes a base 411 and a supporting structure 412 obtained by extending in a thickness direction. The connecting assembly 440 includes four groups of spiral spring structures, and are configured to connect the supporting structure 412 and the vibrating diaphragm 430. The supporting structure 412 is enclosed to form the cavity 450.

Please refer to the schematic cross-sectional view of FIG. 11, it is based on a structural design principle that a distance between the vibrating diaphragm and the supporting structure in a direction parallel to the vibrating diaphragm is as small as possible. In the high-acoustic-resistance piston motion loudspeaker 400 provided in Embodiment 4 of the present disclosure, the connecting assembly 440 is not coplanar with the vibrating diaphragm 430. The connecting assembly 440 has an overlapping part with a projection region of the vibrating diaphragm 430 on a horizontal plane, which is of a concealed connecting structure. A width of a gap between the vibrating diaphragm 430 and the supporting structure 412 in a horizontal direction is smaller than a width of the connecting assembly 440, which effectively reduces a cross-sectional area of an air gap between front and rear cavities. In the working state of the loudspeaker, a displacement range of the vibrating diaphragm 430 is within a height range of the cavity 450, it is ensured that the cross-sectional area of the air gap between the front and rear cavities in the whole working process is maintained at a small value, and a purpose of increasing the acoustic resistance of the front and rear cavities is achieved.

Please refer to the schematic cross-sectional view of FIG. 11, it is based on a structural design principle that an overlapping distance between the vibrating diaphragm and the supporting structure in a direction perpendicular to the vibrating diaphragm is as large as possible. In the high-acoustic-resistance piston motion loudspeaker 400 provided in Embodiment 4 of the present disclosure, a cross-sectional view of the vibrating diaphragm 430 is the Chinese radical "cover". Compared with a vibrating diaphragm structure of which a cross-sectional view is a rectangle, on the basis of controlling the quality of the vibrating diaphragm, an overlapping area of the vibrating diaphragm 430 and the supporting structure 412 in the direction perpendicular to the vibrating diaphragm 430 is increased, a length of the air gap between the front and rear cavities is effectively increased, and the purpose of increasing the acoustic resistance of the front and rear cavities is achieved.

Embodiment 5

Figure 1:
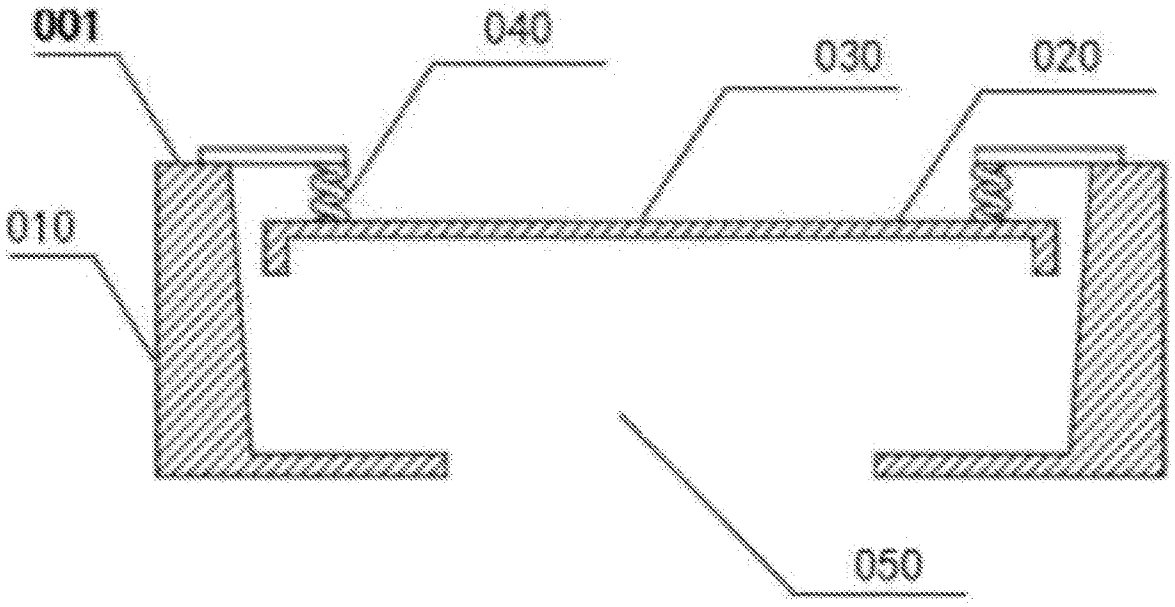

Please refer to FIG. 1, a high-acoustic-resistance piston motion loudspeaker 001 provided according to Embodiment 5 of the present disclosure includes a substrate 010, a driving assembly 020, a vibrating diaphragm 030, a connecting assembly 040 and a cavity 050. The vibrating diaphragm 030 is a circle, and a cross section of the cavity 050 is a circle, which is matched with a shape of the vibrating diaphragm 030. The driving assembly 020 is of a spiral structure, and is embedded into the vibrating diaphragm 030.

Please refer to the schematic cross-sectional view of FIG. 1, it is based on a structural design principle that a distance between the vibrating diaphragm and the supporting structure in a direction parallel to the vibrating diaphragm is as small as possible. In the high-acoustic-resistance piston motion loudspeaker 001 provided in Embodiment 5 of the present disclosure, the connecting assembly 040 is not coplanar with the vibrating diaphragm 030. The connecting assembly 040 has an overlapping part with a projection region of the vibrating diaphragm 030 on a horizontal plane, which is of a concealed connecting structure. A width of a gap between the vibrating diaphragm 030 and the supporting structure in a horizontal direction is smaller than a width of the connecting assembly 040, which effectively reduces a cross-sectional area of an air gap between front and rear cavities. In the working state of the loudspeaker, a displacement range of the vibrating diaphragm 030 is within a height range of the cavity 050, it is ensured that the cross-sectional area of the air gap between the front and rear cavities in the whole working process is maintained at a small value, and a purpose of increasing the acoustic resistance of the front and rear cavities is achieved.

Please refer to the schematic cross-sectional view of FIG. 1, which is the same as Embodiment 1, it is based on a structural design principle that the shape, size and number of openings of the base in the direction parallel to the vibrating diaphragm are adjusted. In the high-acoustic-resistance piston motion loudspeaker 001 provided in Embodiment 5 of the present disclosure, a through hole is formed in a central position of the base, a blocking structure is arranged on a remaining part of the base, air leakage between the front and rear cavities is reduced, and the purpose of increasing the acoustic resistance of the front and rear cavities is achieved.

Please refer to the schematic cross-sectional view of FIG. 1, which is the same as Embodiment 3, it is based on a structural design principle that a distance between the vibrating diaphragm and the supporting structure in a direction parallel to the vibrating diaphragm is as small as possible, the supporting structure is successive in a thickness direction but not perpendicular to the vibrating diaphragm, and forms a certain tilt angle with the vibrating diaphragm. In the high-acoustic-resistance piston motion loudspeaker 001 provided in Embodiment 5 of the present disclosure, a cross-sectional view of the supporting structure is an inverted isosceles trapezoid.

Please refer to the schematic cross-sectional view of FIG. 1, which is the same as Embodiment 4, it is based on a structural design principle that an overlapping distance between the vibrating diaphragm and the supporting structure in a direction perpendicular to the vibrating diaphragm is as large as possible. In the high-acoustic-resistance piston motion loudspeaker 001 provided in Embodiment 5 of the present disclosure, a cross-sectional view of the vibrating diaphragm 030 is the Chinese radical "cover". Compared with a vibrating diaphragm structure of which a cross-sectional view is a rectangle, on the basis of controlling the quality of the vibrating diaphragm, an overlapping area of the vibrating diaphragm 030 and the supporting structure in the direction perpendicular to the vibrating diaphragm 030 is increased, a length of the air gap between the front and rear cavities is effectively increased, and the purpose of increasing the acoustic resistance of the front and rear cavities is achieved.

The specific description mentioned above provides a further detailed explanation for the objectives, technical solutions, and beneficial effects of the present disclosure. It should be understood that the above description is only specific embodiments of the present disclosure and not intended to limit the protection scope of the present disclosure. Any modifications, equivalent replacements, improvements and the like made within the spirit and principles of the present disclosure should be included in the protection scope of the present disclosure.

What is claimed is:

1. High-acoustic-resistance piston motion loudspeaker, comprising a substrate, a vibration cavity, a driving assembly, a connecting assembly and a vibrating diaphragm, wherein the substrate comprises a base and a supporting structure extending in a thickness direction of the base, and a periphery of the supporting structure is enclosed to form the vibration cavity; the connecting assembly is not coplanar with the vibrating diaphragm, which is a concealed connecting structure; the driving assembly and the connecting assembly are of the same structure or different structures, configured to drive the vibrating diaphragm to generate a piston motion, and composed of one or more groups of driving units; and the vibrating diaphragm is located in the vibration cavity, the vibrating diaphragm is not coplanar with the connecting assembly, the vibrating diaphragm is above the connecting assembly or below the connecting assembly to realize the concealed connecting structure, and a displacement range of the vibrating diaphragm is within a height range of the vibration cavity formed by the supporting structure extending in the thickness direction of the base, so as to achieve purposes of reducing air leakage and improving a sound pressure level in a working process of the loudspeaker;

wherein in a direction parallel to the diaphragm, a spacing is formed between the diaphragm and the supporting structure extending in the thickness direction of the base;

wherein design of a vibrating diaphragm structure and the supporting structure of the loudspeaker is further optimized based on the piston loudspeaker with the concealed connecting structure, that is, design of a shape, size and number of openings of the base in a direction parallel to the vibrating diaphragm is optimized, a distance between the vibrating diaphragm and the supporting structure extending in the thickness direction of the base in a direction parallel to the vibrating diaphragm is reduced as much as possible, an overlapping distance between the vibrating diaphragm and the supporting structure extending in the thickness direction of the base in a direction perpendicular to the vibrating diaphragm is increased as much as possible, design of a shape of the supporting structure extending in the thickness direction of the base is optimized, so that a phenomenon of air leakage in the working process of the loudspeaker is controlled, and acoustic resistance of front and rear cavities and an output sound pressure level of the loudspeaker are further increased.

2. The high-acoustic-resistance piston motion loudspeaker of claim 1, wherein an optimized structure for further controlling an air leakage problem by optimizing design of the vibrating diaphragm structure and the supporting structure is that the distance between the vibrating diaphragm and the supporting structure extending in the thickness direction of the base in a direction parallel to the vibrating diaphragm is as small as possible, the overlapping distance between the vibrating diaphragm and the supporting structure extending in the thickness direction of the base in a direction perpendicular to the vibrating diaphragm is as large as possible, and the supporting structure extending in the thickness direction of the base is successive in the thickness direction and is perpendicular to the vibrating diaphragm, so that a problem of air leakage is controlled, and a requirement of manufacturing flexibility is met.

3. The high-acoustic-resistance piston motion loudspeaker of claim 1, wherein an optimized structure for further controlling an air leakage problem by optimizing design of the vibrating diaphragm structure and the supporting structure is that the distance between the vibrating diaphragm and the supporting structure extending in the thickness direction of the base in a direction parallel to the vibrating diaphragm is as small as possible, the overlapping distance between the vibrating diaphragm and the supporting structure extending in the thickness direction of the base in a direction perpendicular to the vibrating diaphragm is as large as possible, and the supporting structure extending in the thickness direction of the base is not successive in the thickness direction and is perpendicular to the vibrating diaphragm in segments, so that a problem of air leakage is controlled, a large area of thin film is prepared, and a requirement of manufacturing flexibility is met.

4. The high-acoustic-resistance piston motion loudspeaker of claim 1, wherein an optimized structure for further controlling an air leakage problem by optimizing design of the vibrating diaphragm structure and the supporting structure is that the distance between the vibrating diaphragm and the supporting structure extending in the thickness direction of the base in a direction parallel to the vibrating diaphragm is as small as possible, the overlapping distance between the vibrating diaphragm and the supporting structure extending in the thickness direction of the base in a direction perpendicular to the vibrating diaphragm is as large as possible, the supporting structure extending in the thickness direction of the base is not perpendicular to the vibrating diaphragm and forms an obtuse angle or an acute angle with the vibrating diaphragm, so that a problem of air leakage is controlled, a thin film is prepared, and a requirement of manufacturing flexibility is met.

5. The high-acoustic-resistance piston motion loudspeaker of claim 1, wherein an optimized structure for further controlling an air leakage problem by optimizing design of the vibrating diaphragm structure and the supporting structure is that the distance between the vibrating diaphragm and the supporting structure extending in the thickness direction of the base in a direction parallel to the vibrating diaphragm is as small as possible, the overlapping distance between the vibrating diaphragm and the supporting structure extending in the thickness direction of the base in a direction perpendicular to the vibrating diaphragm is as large as possible, the shape, size and number of the opening of the base in the direction parallel to the vibrating diaphragm are adjusted, so that a problem of air leakage is controlled, a thin film is prepared, and a requirement of manufacturing flexibility is met.

6. The high-acoustic-resistance piston motion loudspeaker of claim 1, wherein a driving structure is implemented based on an electromagnetic driving principle, a piezoelectric driving principle or an electric heating driving principle, and the driving units are driving arms or electromagnetic coils;

each group of the driving units of the driving assembly comprises a single-driving-arm structure, a double-driving-arm side-by-side structure or a three-drive-arm side-by-side structure;

the driving assembly comprises one group, two groups, four groups or more groups of the driving arm structures; and each driving arm structure of the driving assembly is in an L shape, an S shape, a spiral shape or a serpentiform shape.

7. The high-acoustic-resistance piston motion loudspeaker of claim 1, wherein a top view of the vibrating diaphragm is a rectangle, a circle or other regular shapes, such as a regular pentagon and a regular hexagon; the shape of the vibrating diaphragm is matched with a shape projected by the vibration cavity on a horizontal plane;

a cross-sectional view of the vibrating diaphragm is a rectangle, the Chinese radical “cover”, or the inverted Chinese radical “cover”; and a cross-sectional view of the supporting structure is a rectangle, a trapezoid, an isosceles trapezoid, an inverted isosceles trapezoid, a convex shape, or an inverted convex shape.

8. The high-acoustic-resistance piston motion loudspeaker of claim 1, wherein under an exciting action of an external electrical signal, the driving assembly is forced to make mechanical deformation and drive the vibrating diaphragm to make the piston motion in a direction perpendicular to the vibrating diaphragm; the vibrating diaphragm making the piston motion in a perpendicular direction drives air inside the vibration cavity to move, so as to generate an acoustic wave signal; the vibrating diaphragm is not coplanar with the connecting assembly, and a displacement range of the vibrating diaphragm in the perpendicular direction is within the height range of the vibration cavity formed by the supporting structure extending in the thickness direction of the base; and in addition, the vibrating diaphragm, the supporting structure and other assemblies of the loudspeaker are further optimized, so that air leakage introduced by a gap are effectively controlled, the acoustic resistance of front and rear cavities is increased, sound pressure level loss is reduced, and the output sound pressure level of the loudspeaker is improved.

9. The high-acoustic-resistance piston motion loudspeaker of claim 1, wherein the loudspeaker is an MEMS high-acoustic-resistance piston motion loudspeaker.

* * * * *